Figure 1:
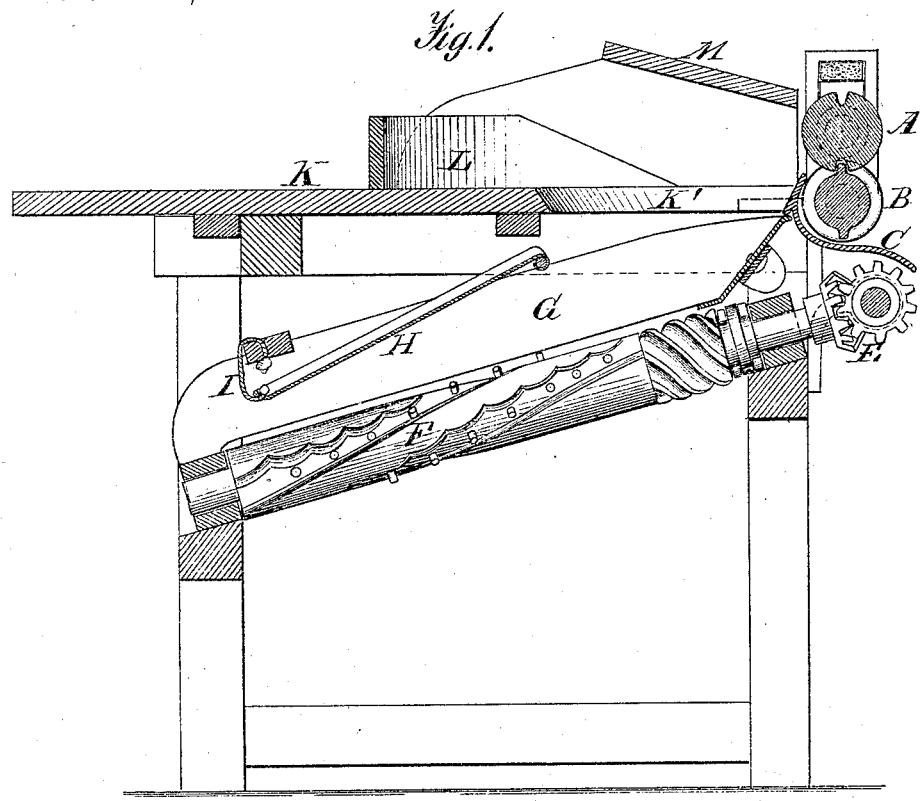

P. PHILIP.
Corn-Huskers.

No. 135,841.

2 Sheets--Sheet 1.

Patented Feb. 11, 1873.

Witnesses.
A. Ruppert.
B. Edw. J. Eils.

Inventor.
Peter Philip

P. PHILIP.
Corn-Huskers.

No. 135,841. Patented Feb. 11, 1873.

Witnesses.
A. Ruppert.

Inventor.
Peter Philip

UNITED STATES PATENT OFFICE.

PETER PHILIP, OF STOCKPORT, NEW YORK.

IMPROVEMENT IN CORN-HUSKERS.

Specification forming part of Letters Patent No. 135,841, dated February 11, 1873.

*To all whom it may concern:*

Be it known that I, PETER PHILIP, of Stockport, in the county of Columbia and State of New York, have invented certain Improvements in Corn-Huskers, of which the following is a specification:

This invention relates to that type of machines for husking corn which are provided with one set of rolls for picking the ears from the stalk, and another set, or several sets, for stripping the husks from the ears. My improvement consists, first, in constructing a pair of picking-rolls, having spiral grooves and elevations, such as described in my Letters Patent of August 9, A. D. 1870, with reverse grooves and elevations at the end where the stalks are discharged.

In practicing my invention set forth in the above-mentioned Letters Patent it was found that long stalks would be fed laterally to the end of the rolls and clog the journals and bearings, and to avoid this is the object of the reverse grooves and elevations. Between the right-handed and left-handed grooves and elevations are formed several annular grooves and elevations in order to give ample space for clearing the rolls of the stalks. Second, in the employment of a curved shield, arranged underneath the lower picking-roll. One side of this shield curves upward to near the bite of the rolls, protecting the ears of corn against injury from the lower roll; and the other side projects laterally beyond the rolls, and overhangs the gearing which drives the husking-rolls, shielding it from being clogged by detached strips of husk and stalk continually falling from the picking-rolls while the machine is running, as well as from the tops of the stalks as they are discharged. Third, in the use of a gravitating-plate loosely suspended over a pair of husking-rolls. The inclination of this plate is in the same direction as that of the husking-rolls, but somewhat steeper than that; and its upper end, which turns on a pivot or axis, serves to deflect any ears bounding upward from the husking-rolls as they fall thereon from the picking-rolls back into the channel between the rolls, while its lower end, which is suspended by a cord or chain, presses lightly upon the ears as they pass successively under it down the husking-rolls, and, in thus augmenting the pressure with which the ears bear upon the rolls, aids very materially in their effective husking without to any objectionable extent retarding the progress of the ears as spring presser-pads are apt to do; and, besides, the pressure will be the same upon all sizes of ears. Fourth, in the construction of the table over which the stalks of corn are fed to the picking-rolls. Upon its top it has a diagonally-arranged guide-board to direct the stalks to the proper end of the picking-rolls; and an inclined board overhead, at the end adjacent to the picking-rolls, aids in guiding the stalks into the bite of the rolls. Back of the diagonal guide-board its front edge is recessed to let the ears fall through as they are pinched off the stalks by the picking-rolls.

Figure 2:
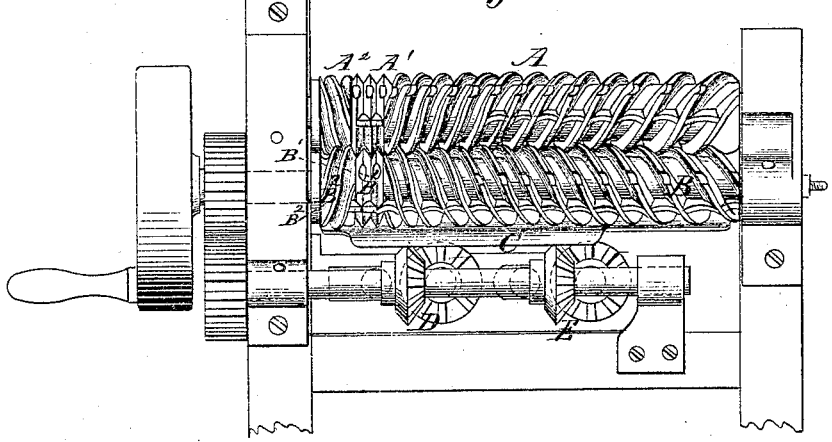
Figure 3:
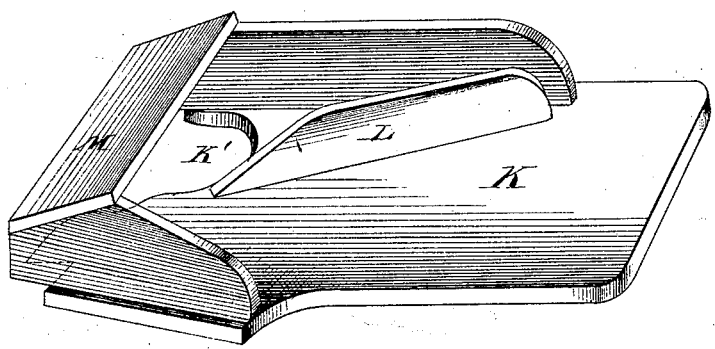
Figure 4:
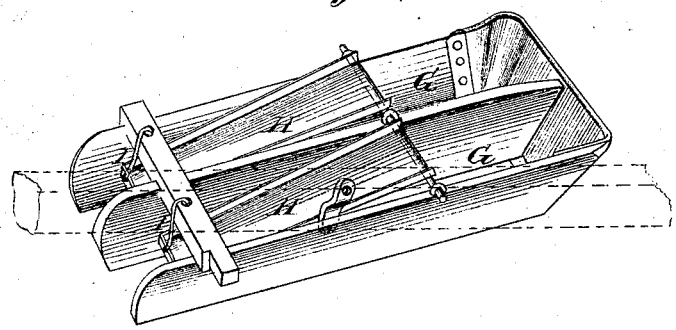
Figure 5:
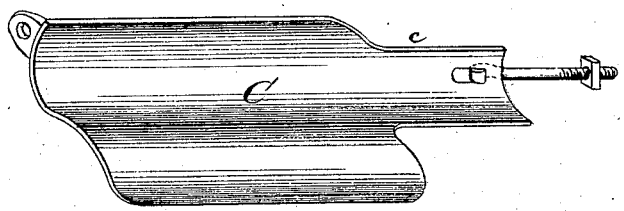

Figure 1 is a vertical longitudinal section of my improved machine complete. Fig. 2 is an elevation of the picking-rolls and the gearing for driving them and the husking-rolls. Fig. 3 is a perspective view of the feed-table. Fig. 4 is a perspective view of the husking-rolls, troughs, and gravitating-plates. Fig. 5 is a perspective view of the shield underneath the picking-rolls.

The same letters of reference are used in all the figures in the designation of identical parts.

The picking-rolls A B are provided with spiral grooves and elevations of gradually-lessening pitch, as described in my patent of August 9, A. D. 1870; but, instead of extending to the discharge-end of the rolls, they terminate some distance from it; and beyond them the rolls are constructed, first, with several annular grooves and elevations $A^1 B^1$, and near the extreme end with spiral grooves and elevations $A^2 B^2$, running in a reverse direction, as clearly shown in Fig. 2. Did the left-handed and right-handed spiral grooves and elevations meet, the space through which all the stalks must then be discharged would be so contracted as to endanger the choking of the rolls at that point. This difficulty is met by the provision of the annular grooves and elevations $A^1$ and $B^1$. These rolls are opals rovided with longitudinal ribs and corresponding grooves to insure the removal of the ears from the stalks.

The shield C is curved around the front of the lower picking-roll, reaching with its edge to near the bite of the rolls, as best seen in Fig. 1; and its other side overhangs the gearings D and E which drive the two sets of husking-rolls. The shield is suitably secured to the frame-work, and a portion of its upper edge may be cut away, as at $c$, where the butt-end of the stalk enters between the rolls.

Each set of husking-rolls F is, as usually, surmounted by a trough, G; and each such trough carries a plate, H, which, fitting loosely between its sides, is, at its top end, hinged to the trough, and at its lower end suspended from a cross-bar by a cord or chain, I, as shown in Figs. 1 and 4.

The feed-table K is provided with side boards at the end adjoining the picking-rolls; and a diagonal board, L, upon its top, directs the stalks to the proper end of the rolls, while an inclined board, M, overhead guides the stalks into the bite of the rolls.

At K' the front edge of the table has a recess for the purposes stated.

I am aware that presser-plates have been known in connection with husking-rolls, either held rigid at both ends, though adjustable, or pivoted at the upper end, and resting with the other, loose, end upon the rolls. The plate I use is substantially different from those in that it is pivoted at one end and adjustably suspended above the rolls at the other end.

What I claim as my invention, and desire to secure by Letters Patent, is—

1. The picking-rolls constructed with annular grooves and elevations $A^1 B^1$ and spiral grooves and elevations $A^2 B^2$, running in a direction reverse to the spiral grooves and elevations upon the main portion of the rolls, substantially as and for the purposes specified.

2. The shield C, constructed and arranged, with reference to the picking-rolls and the gearings D and E, substantially as and for the purpose specified.

3. The plate H, arranged above a pair of husking-rolls, being hinged at its upper end, and adjustably suspended by a cord or chain, I, at its lower end, substantially as and for the purpose specified.

4. The feed-table K K', constructed with the diagonal guide-board L and overhanging inclined guide-board M, substantially as and for the purposes set forth.

In testimony whereof I have signed my name to the foregoing specification in the presence of two subscribing witnesses.

PETER PHILIP.

Witnesses:
THOMAS C. CONNOLLY,
JNO. A. BROWN.